2,799,592
Patented July 16, 1957

2,799,592

RAPID PREPARATION OF ENCAPSULATION MIXTURE

Lloyd Frank Hansen, Pearl River, and Joseph Francis Weidenheimer, Orangeburg, N. Y., assignors to American Cyanamid Company, New York, N. Y., a corporation of Maine No Drawing. Application September 25, 1953, Serial No. 382,478

1 Claim. (Cl. 106—135)

This invention relates to improvements in a method for preparing a gelatin composition to be cast into a strip material to be used in manufacturing soft gelatin capsules. In the manufacture of soft gelatin capsules a thin continuous strip material comprising gelatin, glycerin and water is used. The strip material may additionally contain pigments, dyes, preservatives, and flavors for identification, ornamentation, and aesthetic attraction.

In preparing such a mixture, it is necessary that the strip material be free from air bubbles in order that the portion of the strips forming the capsules adhere to one another, to avoid flaws in the surface of the capsule.

In the past this has been achieved by mixing the water and glycerin as a chilled liquid, adding it to the chilled gelatin, mixing and permitting it to hydrate to form a homogeneous sponge, and then melting the sponge to form a thick viscous fluid. This fluid is allowed to stand until any trapped bubbles of air rise to the surface. If the melting is conducted in a vacuum the time for the elimination of the bubbles is somewhat decreased. Either procedure is slow, ties up the equipment for a relatively long time, and permits the gelatin to degrade while it is being held at a casting temperature for the elimination of the air bubbles.

This invention provides a method whereby the gelatin, together with any solids such as pigments, dyes, flavors, and preservatives, is placed in a vacuum tight mixer, the mixer closed and evacuated. The gelatin in granular or flake form and the other solids are agitated, thereby insuring a homogeneous mixture of the gelatin and any pigments and other solids that may be present. Any trapped air as well as occluded and absorbed air is released, thereby giving a substantially air free dry gelatin mixture. The gelatin is thus freed from air before any liquids are added, thereby preventing any entrapment of air in the mixture.

The liquid portion of the mixture, comprising water, glycerin, and if desired, liquid soluble preservatives, flavoring agents, and dyes, is mixed together. This liquid composition is then drawn into the mixer by vacuum, preferably with continuous agitation. The agitators may be stopped during the addition of the liquids. By agitating rapidly, the mixture becomes homogeneous before an appreciable amount of the water is absorbed by the gelatin and thereby a uniform homogeneous mixture is obtained. The water and the glycerin may be added separately, in any order, but separate addition has no advantages and is slower.

The mixture of glycerin, gelatin and water is then agitated under vacuum while heat is applied to the mixture. If the mixer is air tight the air pressure will not rise even though the mixer is not connected to a vacuum line. The water vapor pressure will rise some. Any air that leaks in or is trapped should be removed by vacuum. Excess water may be added to provide for losses through the vacuum system. The vacuum applied should be just slightly below that required to cause the water present to flash to vapor. Heat is applied with agitation until the temperature of the mixture rises to that desired for casting, normally from about 42° C. to about 60° C.

The mixture can be heated to about 85° C. or more to assist in ease of mixing, and so that the mixture is thin enough to handle easily, if it is cooled again to below about 60° C. before the gelatin has unduly degraded.

Steam or hot water may be used as a source of heat, but the agitation should be strong enough that local overheating does not occur. The mixing operation may be conducted at room temperature, and chilling is not necessary, because there is no air present with the solids or the liquids, when mixed, so the tendency for air to be trapped in the mixer is minimized. A thin uniform slurry is formed before the water is absorbed by the gelatin and a homogeneous mixture results.

Any pigments or other solid materials may be incorporated with the solid gelatin and blended with it before the addition of the liquids.

Dyes, flavors and water soluble solid materials may be mixed in the liquid portion, and the combined liquids added at one time, or such additional components may be added either to the glycerin or the water and either the glycerin or the water added first to the solids. It is necessary that the gelatin and the liquids be sufficiently rapidly agitated that a homogeneous mixture is formed before appreciable hydration of the gelatin has occurred.

The mixer may be a jacketed mixer or may have heating coils, or have electric heaters attached. A sigma arm mixer or a ribbon mixer is useful. The blades themselves may be heated. It is preferred to use a mixer in which the agitators extend through the top of the mixer so that any air leakage around the shafts do not cause the mixture to foam. The mixer should be one in which there is a minimum of unstirred spaces and should be easily cleanable; as a gelatin mixture, particularly if permitted to harden, is difficult to remove.

The completed mixture may be dumped into a hopper or container for transfer to a gelatin casting machine, or preferably is transferred through hot water jacketed pipes under air pressure to storage vessels.

Example 1

A jacketed sigma arm mixer with air tight seals and a vacuum tight cover had placed therein 115.2 kilograms of 200 Bloom strength pork skin gelatin and 1.2 kilograms of crimson red pigment. The cover was fastened on the mixer, the system evacuated to 29 inches of vacuum and agitated for 10 minutes at room temperature. 120 grams of red dye, 72 grams of yellow dye, and 240 grams of blue dye were dissolved in 83.76 kilograms of distilled water. 43.2 kilograms of glycerin were added. 252 grams of beta naphthol, 192 grams of methyl para-hydroxybenzoate and 48 grams of propyl para-hydroxybenzoate and 300 grams of synthetic vanilla were dissolved in 3.6 kilograms of ethyl alcohol. This solution was added to the water and glycerin. The mixture was stirred to insure homogeneity. The mixed liquids were drawn by vacuum into the mixer while continuing agitation.

The vacuum was maintained at slightly below the vapor pressure of water at the temperature of the materials in the mixer as steam was circulated through the mixer jacket. After about 2½ hours the mixture had melted and reached a temperature of 54° C. The steam pressure in the jacket was reduced shortly before the mixture reached 54° C. so that the mixer would not over-run the temperature, and the mixing continued until the mixer and its contents reached temperature equilibrium. Stirring was discontinued and the mixture allowed to stand for 30 minutes, then discharged through a connection through the bottom of the mixer to a storage tank by air pressure. The storage tank was maintained under a lower air pressure so that casting operations could be continued while the storage tank was being refilled with the gelatin mixture.

Example 2

A jacketed sigma arm mixer with air-tight seals and a vacuum tight cover had placed therein 115.2 kilograms of Bloom strength pork skin gelatin, 1.2 kilograms of crimson red pigment, 120 grams of red dye, 72 grams of yellow dye, 240 grams of blue dye, 252 grams of beta naphthol, 192 grams of methyl para-hydroxybenzoate, 48 grams of propyl para-hydroxybenzoate, and 300 grams of ethyl vanillin. The cover was fastened on the mixer and the system evacuated to 29 inches of vacuum and stirred for 10 minutes. The agitators were stopped and a mixture of 83.76 kilograms of distilled water, and 43.2 kilograms of glycerin were drawn into the mixer by vacuum without breaking the vacuum. The mixture was immediately strongly stirred to insure homogeneity. The balling of the powders and the liquids was reduced by stopping the agitators during the addition of the liquid. A thin uniform homogeneous slurry was immediately formed. Steam was circulated through the mixer jacket while agitation was continued, and the mixer heated by steam until the mixture had melted and reached a temperature of 60° C. The steam supply in the jacket was discontinued at approximately 59° C. so that the mixture would not overrun the desired temperature and the mixing continued until the mixture had reached temperature equilibrium. Agitation was discontinued, and the mixture was discharged under air pressure to a storage tank for the gelatine mixture casting operation.

Example 3

A jacketed sigma arm mixer with air-tight seals and a vacuum tight cover had placed therein 115.2 kilograms of 125 Bloom strength pork skin gelatin. The cover was fastened on the mixer, and the system evacuated to 29 inches of vacuum, and agitated for 15 minutes at room temperature. 96 kilograms of water was drawn into the mixer without stopping the agitation, followed by 42.2 kilograms of glycerin. The additions were made sequentially through a single line, although concurrent additions through separate lines would have been equally satisfactory. The mixing was continued while maintaining the vacuum while steam was introduced in the jacket and heating continued until the temperature of the mixture reached 56° C. The steam pressure was cut off and the clear gelatin was discharged to a gelatin mixture casting machine.

The use of clear gelatin has an advantage, in that dye stuffs may be added to the encapsulated materials and the same gelatin mixture used for several products, therefore, increasing flexibility of operations and reducing inventory problems.

Example 4

A jacketed sigma arm mixer in which agitator blades extend from a shaft through the cover and which was vacuum-tight had placed therein 115.2 kilograms of 125 Bloom strength pork skin gelatin, 252 grams of beta naphthol, 192 grams of methyl para-hydroxybenzoate, 48 grams of propyl para-hydroxybenzoate, and 300 grams of ethyl vanillin. The agitators were started and the system evacuated with stirring for approximately 10 minutes. The agitators were stopped, and into the mixture was introduced sequentially 42.2 kilograms of glycerin and 96 kilograms of water. As soon as the liquids had been added, agitation was resumed and steam introduced into the jacket. The mixer was heated until the temperature of the contents was 85° C., thereby giving therein a uniform clear gelatin mixture. The mixture was discharged through a water-cooled transfer line to a holding tank so that the temperature was rapidly reduced to 54° C. before the gelatin had degraded. The mixture was fed from the holding tank to a casting machine.

Having described our invention and given certain examples thereof, as our invention we claim:

The method of preparing a castable air bubble free homogeneous gelatin mixture for the manufacture of soft gelatin capsules which comprises placing subdivided solid dry gelatin in a mixer, evacuating the mixer, agitating the dry gelatin while under vacuum, thereby removing occluded and adsorbed air from the gelatin, adding thereto water and glycerin in any order, rapidly intimately mixing the water, glycerin and gelatin while maintaining the vacuum so that a uniform mixture is obtained before there is appreciable hydration of the gelatin, and heating the mixture to a temperature between about 43° C. and about 85° C., thereby forming a castable air bubble free homogeneous gelatin mixture.

References Cited in the file of this patent

UNITED STATES PATENTS

| | | |
|---|---|---|
| 391,830 | Zuber | Oct. 30, 1888 |
| 2,198,612 | Hardy | Apr. 30, 1940 |
| 2,469,546 | Calhoun | May 10, 1949 |
| 2,558,065 | Tice | June 26, 1951 |
| 2,628,916 | Scherer | Feb. 17, 1953 |
| 2,720,463 | Stirn et al. | Oct. 11, 1955 |